(12) United States Patent
Muth

(10) Patent No.: US 7,917,738 B2
(45) Date of Patent: Mar. 29, 2011

(54) METHOD AND BASE CHIP FOR MONITORING THE OPERATION OF A MICROCONTROLLER UNIT

(75) Inventor: Matthias Muth, Stelle (DE)

(73) Assignee: NXP B.V., Eindhoven (NL)

( * ) Notice: Subject to any disclaimer, the term of this patent is extended or adjusted under 35 U.S.C. 154(b) by 1011 days.

(21) Appl. No.: 10/517,284

(22) PCT Filed: Jun. 5, 2002

(86) PCT No.: PCT/IB03/02138
§ 371 (c)(1),
(2), (4) Date: Dec. 8, 2004

(87) PCT Pub. No.: WO03/104992
PCT Pub. Date: Dec. 18, 2003

(65) Prior Publication Data
US 2006/0116776 A1    Jun. 1, 2006

(30) Foreign Application Priority Data
Jun. 11, 2002    (DE) .................................. 102 25 971

(51) Int. Cl.
*G06F 7/38*    (2006.01)
*G06F 9/00*    (2006.01)
*G06F 9/44*    (2006.01)
*G06F 15/00*    (2006.01)
(52) U.S. Cl. ..................................................... 712/227
(58) Field of Classification Search ............... 712/227
See application file for complete search history.

(56) References Cited

U.S. PATENT DOCUMENTS

| 4,698,748 | A  | * | 10/1987 | Juzswik et al. ............... 713/322 |
| 5,864,663 | A  | * | 1/1999  | Stolan ............................. 714/55 |
| 6,144,887 | A  | * | 11/2000 | Kamiya et al. .................. 700/79 |
| 6,405,328 | B1 |   | 6/2002  | Vasanoja |
| 6,438,462 | B1 |   | 8/2002  | Hanf et al. |
| 6,636,989 | B1 | * | 10/2003 | Kondo et al. ................... 714/23 |
| 2002/0046362 | A1 | | 4/2002 | Bolz |

FOREIGN PATENT DOCUMENTS

| CN | 1 227 642   A  | 9/1999  |
| EP | 0 831 399      | 3/1998  |
| EP | 0 890 241   A1 | 1/1999  |
| EP | 1 143 314   A1 | 10/2001 |
| WO | 00/18613    A1 | 4/2000  |

OTHER PUBLICATIONS

Ubicom Product Report—IP2022 Internet Processor; Jan. 22, 2001; pp. 1-90; Document SXL-DS05-01.*

* cited by examiner

*Primary Examiner* — Eddie P Chan
*Assistant Examiner* — Corey Faherty

(57) ABSTRACT

To enable a method and a base chip (200) for monitoring, by means of at least one base chip (200), the operation of at least one microcontroller unit (300) that is intended for at least one application and is associated with a system (100) to be further developed in such a way a reset of the microcontroller unit (300) only takes place under defined conditions, it is proposed that a reset (R) of the microcontroller unit (300) is caused if at least one special sequence, and particularly at least one drive or access sequence assigned to the reset operation (R), is applied to the base chip (200).

12 Claims, 2 Drawing Sheets

METHOD AND BASE CHIP FOR MONITORING THE OPERATION OF A MICROCONTROLLER UNIT

Figure 1:
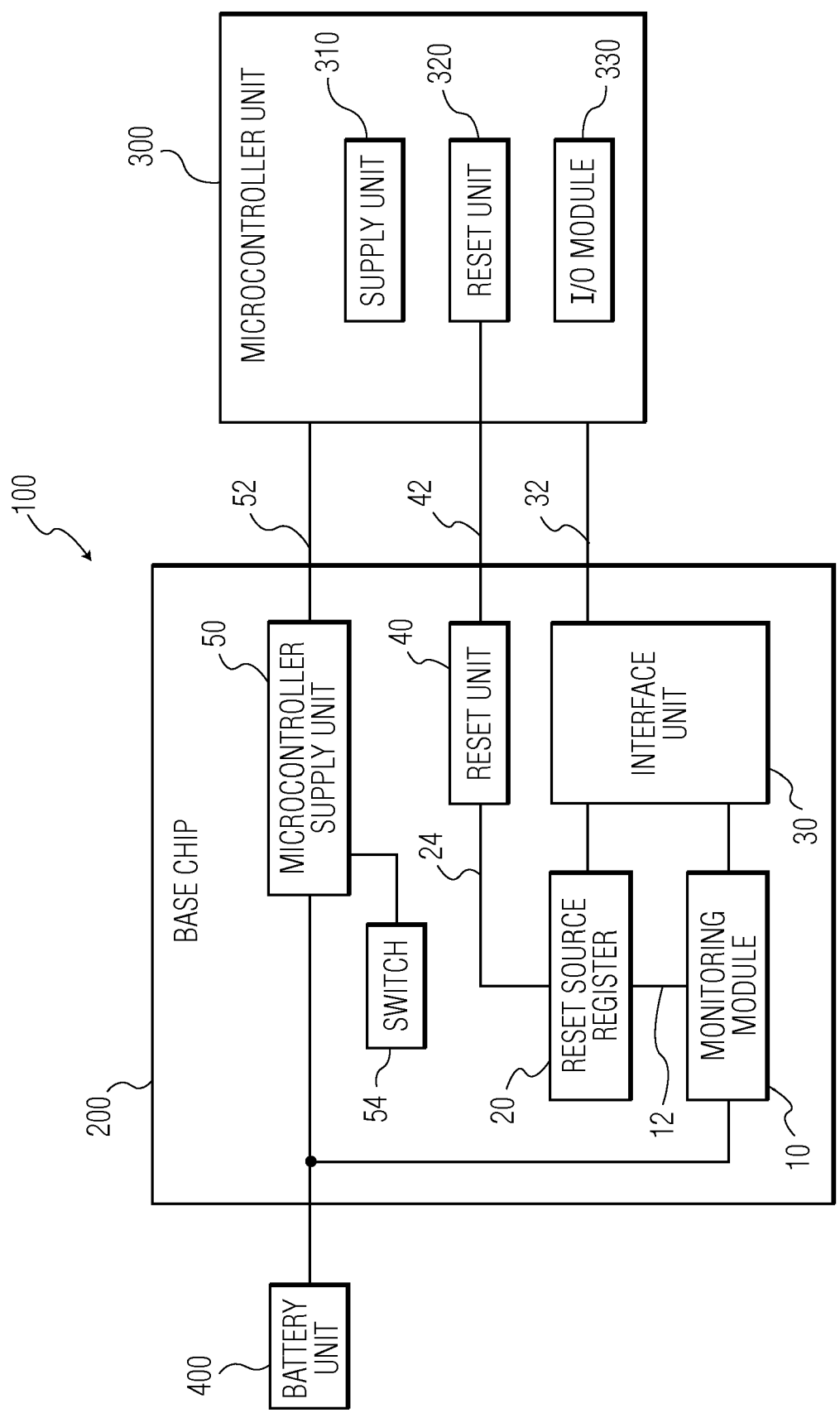

The present invention relates to a method of monitoring the operation of at least one microcontroller unit, that is intended for at least one application and is associated with a system, by means of at least one base chip, and particularly a system base chip.

The present invention further relates to a base chip, and particularly a system base chip, for monitoring the operation of at least one microcontroller unit that is intended for at least one application, and to an associated system, and particularly a control system.

In modern-day control units, in automobile electronics for example, it is no longer usual for use to be made of permanently preprogrammed microcontrollers because the fixed preset program means that modifications cannot then be made in the course of ongoing volume production or by the end-customer.

Motor-vehicle manufacturers are therefore increasingly going over to the practice of using so-called volatile memories or flash memories in the microcontrollers; volatile memories of this kind allow the program code to be overwritten at any time, which can be done both in production and in a repair shop, as part of an inspection say.

The fact that in automobile electronics systems are increasingly being fitted with flash memories of this kind makes it possible for the software of the control unit to be replaced even "in the field", i.e. in a car repair shop for example. In this way, motor vehicles can be modified even after delivery if faults are found in the software, thus enabling ongoing improvements to be made in the quality of the vehicles.

To thus enable the software in the program memory to be overwritten in a microcontroller unit, functions are normally incorporated in the microcontroller unit that ensure that the software is not accidentally overwritten while the motor vehicle is operating. For known microcontroller units, at least one hardware reset is required to enable the flash memory to be overwritten via certain signals at the terminals of the microcontroller unit.

In existing control units, there is always a problem in this connection in triggering the hardware reset mentioned without making alterations directly at the control unit. The control unit is usually difficult of access and therefore cannot be reset easily.

In the prior art, the existing monitoring module or "watchdog" (a configurable timer having a clock-signal derived from an independent source) is often used to trigger the hardware reset. What the term "watchdog" is generally understood to mean in this connection is a technique that is used to monitor devices, connections or software cyclically. If a piece of software is no longer following the ordered path laid down by the software, the watchdog is intended to reset the microcontroller and in this way to restore the running of the program to its planned course.

To trigger the hardware reset, a command to this effect is sent to the control unit that is to undergo reprogramming over the vehicle's serial bus system, which may be a C[ontroller] A[rea] N[etwork] bus, for example. The control unit then interrupts the regular access to the watchdog unit and this, after the overrun, causes a reset to occur.

However, something that is felt to be a disadvantage with this procedure is that the overrun of the watchdog unit always has to be waited for before the control unit can be changed over to the programming mode. Also, it is not easy for the control unit to tell whether the reset is intended to cause entry into a flash programming mode or whether it means that there is some other problem in the control unit in this case.

The same disadvantage exists when the flash programming has been completed, because a fresh hardware reset is then required and this again can only take place as a result of an overrun by the watchdog unit. In this case too, an unnecessarily large amount of time is wasted until the watchdog unit "times out".

In existing schemes for control units, there is also a requirement, for safety reasons, for at least one hardware signal to be altered at the control unit in such a way that the programming mode is enabled. For this too, direct access to the control unit is required, and in modern-day motor vehicles, due to the cramped space available, this is almost impossible.

Something else that is felt to be a very definite problem is enabling the watchdog unit to continue operating while the control unit is being flash programmed. The flash programming routines are time-intensive, and because of this it may no longer be possible under certain circumstances for the watchdog unit to be operated to the usual close tolerances.

Taking the disadvantages and shortcomings described above as a point of departure and with due allowance for the prior art outlined, it is an object of the present invention so to further develop a method of the kind detailed in the first paragraph and a base chip of the kind detailed in the second paragraph that a reset of a microcontroller unit associated with the system only takes place under defined conditions.

This object is achieved by a method having the features specified in claim 1 and by a base chip having the features specified in claim 5. Advantageous embodiments and useful refinements of the present invention are described in the respective sets of dependent claims.

The present invention is therefore based on providing at least one system base chip giving defined flash-mode support, in such a way that a reset of the microcontroller unit is caused when at least one special sequence, and particularly at least one drive or access sequence assigned to resetting, is applied to the base chip.

Under the teaching of the present invention, it is therefore proposed that there be provided, in a system base chip that, by the implementation of at least one monitoring module, also comprises a watchdog function, a mode that allows a hardware reset, that is to say a reset of the hardware, to be triggered deliberately.

In accordance with the invention, this intentional hardware reset is only triggered when a special sequence, and particularly at least one drive or access sequence assigned to resetting, is fed to the system base chip, in order in this way to prevent the reset from being triggered accidentally. This sequence replaces the hardware signal prescribed in the prior art that would be needed directly at the control unit, that is to say the microcontroller unit. This makes it possible to avoid the need for direct access to the control unit, and this in turn allows the control unit to be fitted at any desired point.

In a particularly inventive embodiment, it is proposed that this, as it were, forced reset be made known to the application. For this purpose and in line with the history, it is advantageously indicated in at least one register, and particularly in at least one reset source register, that the reset event was triggered by the special sequence to the system base chip. In this way, it is possible for the software to directly detect that the flash memory unit clearly has to be reprogrammed.

In a preferred embodiment of the present invention, it is proposed that, after a successful special sequence and after a reset was taken place, there be a single opportunity of going to a separate mode, and particularly a separate flash mode, for the system base chip. This special mode allows the system to continue being used as in the normal mode, but use to be made of simplified watchdog triggering.

In this way, the watchdog cycle can be adjusted to the existing flash programming routines without jeopardizing the safety or reliability of the system in the normal mode. During the flash programming, operations can therefore take place with the monitoring module in a so-called "time-out" mode (meaning that triggering must always occur without a given time, though early triggering is permitted) whereas in normal operation use is made of the so-called "window" mode (basically the same as the time-out mode but early triggering is not permitted; the window has to be hit and this makes more stringent demands on the software).

To enable another forced reset to be effected without any waiting time after flash programming has taken place, it is proposed that during the flash mode a different watchdog code may advantageously be used for access to the system base chip, which code may for example be transmitted to the system base chip via the serial interface unit, via say an SPI (serial peripheral interface).

If the flash mode is to be exited, use is preferably made of the normal watchdog access code, which is not permitted during the flash mode and thus produces an immediate system reset. In this case too, the reset source register once again provides the software with the appropriate information to allow the start-up of the software to be controlled as required.

To re-enter the flash mode, the fail-safe sequence has to be sent to the system base chip again. If the flash mode is not activated after the sequence and after the reset has taken place, access to the flash mode is usefully barred until such time as the fail-safe sequence is again sent to the system base chip.

Finally, the present invention relates to the use of a method of the kind described above and/or of at least one base chip of the kind described above for monitoring the operation of at least one microcontroller unit intended for at least one application, in automobile electronics and particularly in the electronics of motor vehicles.

As has already been described above, there are various possible ways in which the teaching of the present invention may advantageously be embodied and refined. On the one hand, reference can be made in this connection to the claims dependent on claims 1 and 5, and on the other, further aspects, features and advantages of the present invention are apparent from and will be elucidated with reference to the illustrative embodiment shown in FIGS. 1 and 2 and described hereinafter.

Figure 2:
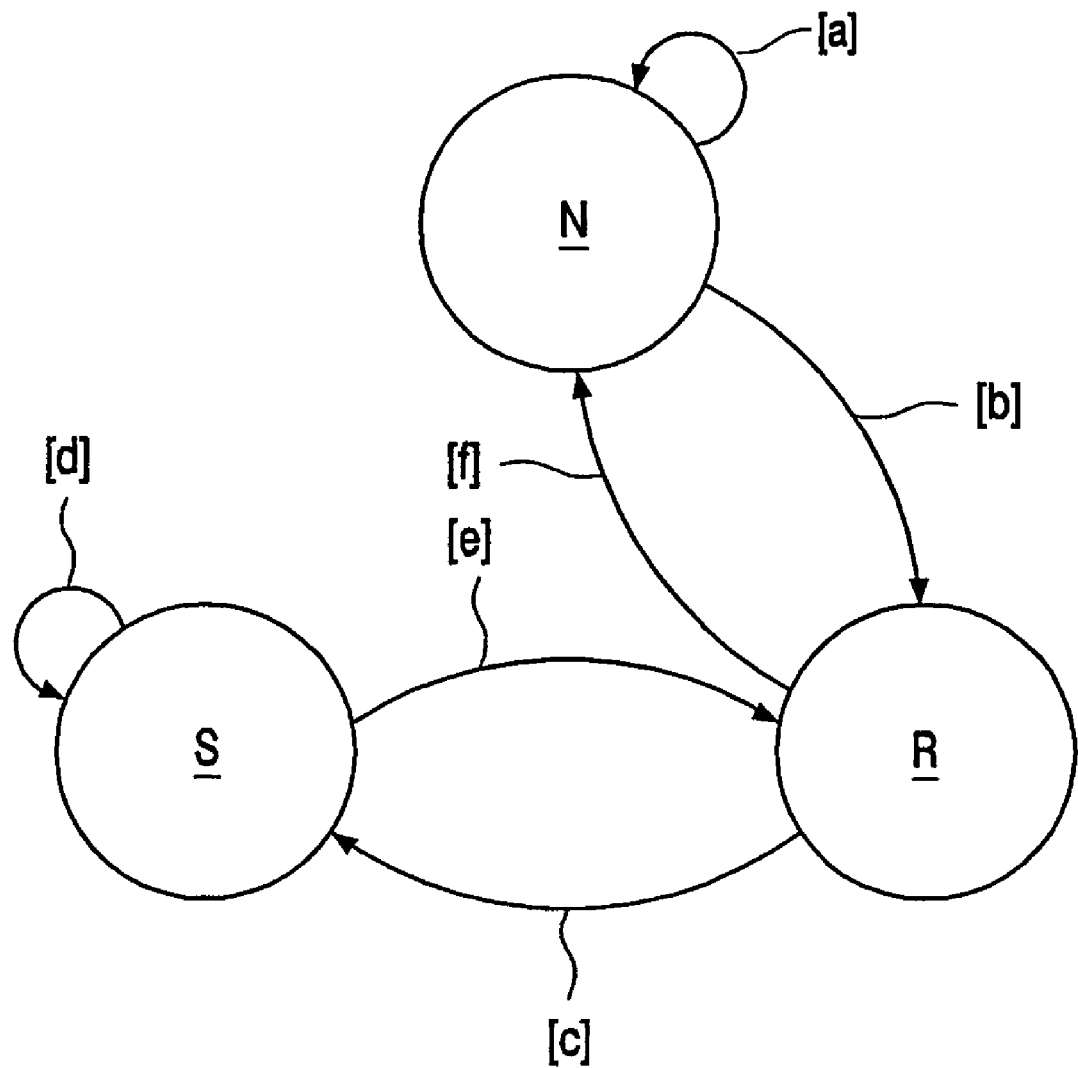

In the drawings:

FIG. 1 is a block diagram of an embodiment of a system according to the present invention having a base chip and a microcontroller unit; and FIG. 2 is a block diagram of an embodiment of flow chart for the method according to the present invention.

Shown diagrammatically in FIG. 1 is a control system 100 that, as well as a microcontroller unit 300 having a supply unit 310 (providing the VDD supply), a reset unit 320 and an I[nput]/O[utput] module 330, also has a so-called S[ystem] B[ase] C[hip] 200 that comprises a monitoring module (10) (=a watchdog unit) for monitoring the operation of the microcontroller unit 300, the said microcontroller unit 300 being intended for an application.

Because the system chip 200 allows a distinction to be made between different reset events and the different events to be made accessible to the application microcontroller 300, the system chip 200 has a reset source register 20 that is provided to allow for different reset events, and a reset unit 40 (for system resets) that is connected to the microcontroller unit 300 by a connection 42 (going to the reset unit 320 of the microcontroller unit 300).

To allow information and signals to be exchanged, the monitoring module 10 and the reset source register 20 have inserted in front of them an interface unit 30 (feeding the I[nput]/O[utput] module 330 of the microcontroller unit 300).

As is also apparent from what is shown in FIG. 1, the monitoring module 10 and a microcontroller supply unit 50 that is connected to the microcontroller unit 300 by a connection 52 have permanently associated with them at least one battery unit 400. Whereas the monitoring module 10 receives a permanent supply from the battery 400, the microcontroller supply unit 50 can be switched on and off by means of a switch 54, thus enabling a temporary energy supply to be associated with the microcontroller unit 300 via the microcontroller supply unit 50 (supplying the VDD supply unit 310 of the microcontroller unit 300).

The hardware basics of the system 100 according to the present invention having thus been elucidated, the diagram in FIG. 2 now shows, in chart form, a typical embodiment of flow for a method according to the present invention.

This method is performed by means of the system base chip 200 that, by means of a special (access) sequence, is able to "deliberately" trigger a hardware reset R of the system 100. For this purpose, the system base chip 200 makes it known in the prescribed reset source register 20 that the hardware reset R is being performed deliberately, in order in this way to inform the software of why the hardware reset R has been carried out; the transition to an appropriate routine is made possible in this way.

This special sequence ensures that the hardware reset R is not being carried out unintentionally, which is indicated in FIG. 2 by the enquiry routine [b] that leads from the normal mode of operation N of the microcontroller unit 300 to the hardware reset R. Under this enquiry routine [b], a check is made to see whether the special sequence has been successfully transmitted, whereupon a special module of operation S, namely a flash mode, of the microcontroller unit 300 is permitted.

In line with this, the system base chip 200 allows the special mode of operation (=the flash mode S in this case), in which the watchdog access can take place in a simplified manner, to be activated once after the access sequence and after the reset R has taken place. What happens in this case is that the microcontroller unit 300 activates the special mode of operation S, namely the flash mode, permission having been given for the flash mode (see FIG. 2: enquiry routine [c] from hardware reset R to flash mode (time-out watchdog) S).

During the special mode, namely the flash mode S, use is made of a special trigger code, namely a flash watchdog trigger code under enquiry routine [d] that differs from the normal watchdog trigger code under enquiry routine [a], to ensure that the software will run the correct routine.

If a different or incorrect watchdog trigger code is then used during the special mode of operations, the flash mode will be embargoed (see FIG. 2: enquiry routine [e] from flash mode (time-out watchdog) S to hardware reset R), and the system base chip will at once trigger another hardware reset R; the reset source register 20 is set accordingly and the special mode S is exited in this way.

Also, the enquiry routine [f] leading from the hardware reset R to the normal mode of operation N of the microcontroller unit 300 indicates that the microcontroller unit 300 activates the normal mode of operation N, which is equivalent to an embargo on the special mode of operation S, namely the flash mode of the microcontroller unit 300.

So, to sum up, it can be said that the system 100 shown in FIG. 1 and the method shown in FIG. 2 are designed to monitor the operation of a microcontroller unit 300 that is intended for an application and is associated with a system 100, by means of a system base chip 200:

In so doing, use is made of a function that enables a failsafe previously input mode of operation of the system base chip 200 to be implemented, which in turn permits an intended hardware reset for the application, both at the beginning and at the end of the said mode of operation. This function thus allows an optimum flash-memory programming mode to be implemented within the system base chip 200 during a triggering of the watchdog.

LIST OF REFERENCE NUMERALS

100 System, in particular a control system
10 Monitoring module, in particular a watchdog unit
12 Connection between monitoring module 10 and register unit 20
20 Register unit, in particular a reset source register
24 Connection between register unit 20 and reset unit 40
30 Interface unit
32 Connection, in particular a signal line, between interface unit 30 and microcontroller unit 300
40 Reset unit
42 Connection between reset unit 40 and microcontroller unit 300
50 Supply unit
52 Connection between supply unit 50 and microcontroller unit 300
54 Switch of supply unit 50
200 Base chip, in particular a system base chip
300 Microcontroller unit, in particular an application microcontroller
310 Supply unit for microcontroller unit 300
320 Reset unit for microcontroller unit 300
330 I[nput]/O[utput] module of microcontroller unit 300
400 Battery unit
N Normal mode of operation of microcontroller unit 300
R Reset of microcontroller unit 300
S Special mode of operation, in particular a flash mode, of microcontroller unit 300

The invention claimed is:

1. A method of monitoring the operation of a microcontroller unit that is intended for at least one application and is associated with a system, by means of a base chip, particularly a system base chip, characterized in that:
    causing a reset of the microcontroller unit if a reset condition is detected, wherein the reset condition is transmission of at least one special sequence, particularly at least one drive or access sequence assigned to the reset operation, to the base chip and the reset of the microcontroller unit is confirmed under an enquiry routine by checking whether the at least one special sequence has been successfully transmitted to the base chip;
    activating a special mode of operation, particularly a flash mode of the base chip, once after the check has been made to see whether the special sequence has been successfully applied and after the reset operation, by allowing access a monitoring module that is associated with the base chip to take place in a manner which is simplified in comparison with the normal mode of operation of the microcontroller unit;
    supplying a permanent energy supply from a battery unit to the monitoring module; and
    switching a microcontroller supply unit of the base chip to enable or disable a temporary energy supply from the battery unit to the microcontroller unit.

2. A method as claimed in claim 1, characterized in that: further comprising:
    during the special mode of operation, using a special trigger code or a special trigger signal for the monitoring module that is different from the normal mode of operation; and
    causing a fresh reset of the microcontroller unit using the normal trigger code or the normal trigger signal, to enable the special mode to be exited again.

3. A method as claimed in claim 1, further comprising:
    making a distinction between reset events that differ in relation to the operation of the microcontroller unit; and
    logging said different reset events and making said different reset events known in at least one register unit using different register entries.

4. A base chip, particularly a system base chip, for monitoring the operation of a microcontroller unit that is intended for at least one application, characterized by:
    a reset unit for resetting the microcontroller unit, which reset unit is connected to said microcontroller unit, wherein a reset of the microcontroller unit is caused if a reset condition is detected, wherein the reset condition is transmission of at least one special sequence, particularly at least one drive or access sequence assigned to the reset operation, to the base chip and the reset of the microcontroller unit is confirmed under an enquiry routine by checking whether the at least one special sequence has been successfully transmitted to the base chip;
    a microcontroller supply unit connected to the microcontroller unit, wherein the microcontroller supply unit is permanently associated with a battery unit;
    a switch connected to the microcontroller supply unit, wherein the switch is configured to switch the microcontroller supply unit to enable or disable a temporary energy supply from the battery unit to the microcontroller unit; and
    a monitoring module that is associated with the microcontroller unit, wherein a special mode of operation, particularly a flash mode of the base chip, can be activated once after the check has been made to see whether the special sequence has been successfully applied and after the reset operation, by allowing access to the monitoring module to take place in a manner which is simplified in comparison with the normal mode of operation of the microcontroller unit, wherein the monitoring module is permanently associated with the battery unit so that the monitoring module receives a permanent energy supply from the battery unit.

5. A base chip as claimed in claim 4, further comprising:
    at least one register unit configured to allow for different reset events, to log and make known different reset events using different register entries.

6. A base chip as claimed in claim 5, characterized in that:
    the monitoring module is triggerable in particular by means of at least one interface unit; or
    to distinguish between the particular accesses to the monitoring module, different reset events can be marked by different trigger codes or trigger signals.

7. A base chip as claimed in claim 6, characterized in that there is provided between the monitoring module and the microcontroller unit at least one signal line for transmitting at least one trigger code or trigger signal that differs from the normal mode of operation of the microcontroller unit.

8. A system, and particularly a control system, characterized by at least one microcontroller unit intended for at least one application and by at least one base chip as claimed in claim 4.

9. Use of a method as claimed in claim 1 for monitoring the operation of at least one microcontroller unit intended for at least one application, in the electronics of motor vehicles.

10. The use of a method as claimed in claim 9, wherein the at least one application includes automobile electronics.

11. Use of at least one base chip as claimed in claim 4 for monitoring the operation of at least one microcontroller unit intended for at least one application, in the electronics of motor vehicles.

12. The use of at least one base chip as claimed in claim 11, wherein the at least one application includes automobile electronics.

* * * * *